(12) United States Patent
Malzbender et al.

(10) Patent No.: US 8,711,198 B2
(45) Date of Patent: Apr. 29, 2014

(54) VIDEO CONFERENCE

(75) Inventors: Tom Malzbender, Palo Alto, CA (US);
Ian N Robinson, Pebble Beach, CA (US); Irwin E Sobel, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 312 days.

(21) Appl. No.: 13/260,343

(22) PCT Filed: Jun. 4, 2009

(86) PCT No.: PCT/US2009/046299
§ 371 (c)(1),
(2), (4) Date: Sep. 25, 2011

(87) PCT Pub. No.: WO2010/141023
PCT Pub. Date: Dec. 9, 2010

(65) Prior Publication Data
US 2012/0026277 A1  Feb. 2, 2012

(51) Int. Cl.
H04N 7/14  (2006.01)
(52) U.S. Cl.
USPC ...................................................... 348/14.03
(58) Field of Classification Search
USPC .................. 715/733; 375/240.21; 709/204
See application file for complete search history.

(56) References Cited

U.S. PATENT DOCUMENTS

| | | | |
|---|---|---|---|
| 2001/0044826 A1* | 11/2001 | Ludwig et al. | 709/204 |
| 2006/0215765 A1* | 9/2006 | Hwang et al. | 375/240.21 |
| 2006/0259552 A1* | 11/2006 | Mock et al. | 709/204 |
| 2008/0030621 A1* | 2/2008 | Ciudad et al. | 348/586 |
| 2008/0184124 A1* | 7/2008 | Agarwal et al. | 715/733 |
| 2009/0079813 A1* | 3/2009 | Hildreth | 348/14.03 |

FOREIGN PATENT DOCUMENTS

JP   2009071478   4/2009

OTHER PUBLICATIONS

ISA/KR, International Search Report dated Feb. 24, 2010, PCT/US2009/046299 filed Jun. 4, 2009.

* cited by examiner

Primary Examiner — Mohammad Islam
(74) Attorney, Agent, or Firm — Chun Kuo

(57) ABSTRACT

A method to present participants in a video conference including determining a participant distance and aligning a region of interest on the participant using one or more depth cameras, creating a cropped video stream of the participant by cropping the region of interest from a video stream of the participant, and arranging the cropped video stream of the participant with additional cropped video streams of additional participants for display in the video conference.

15 Claims, 8 Drawing Sheets

VIDEO CONFERENCE

BACKGROUND

When displaying participants in a video conference, participants often manually adjust camera viewing angles and camera zoom levels in order to capture one or more participants for the video conference. Additionally, participants often physically manipulate their environment by moving objects around. Once the participants are satisfied with the manipulations, video streams of the participants are captured for the video conference.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1:
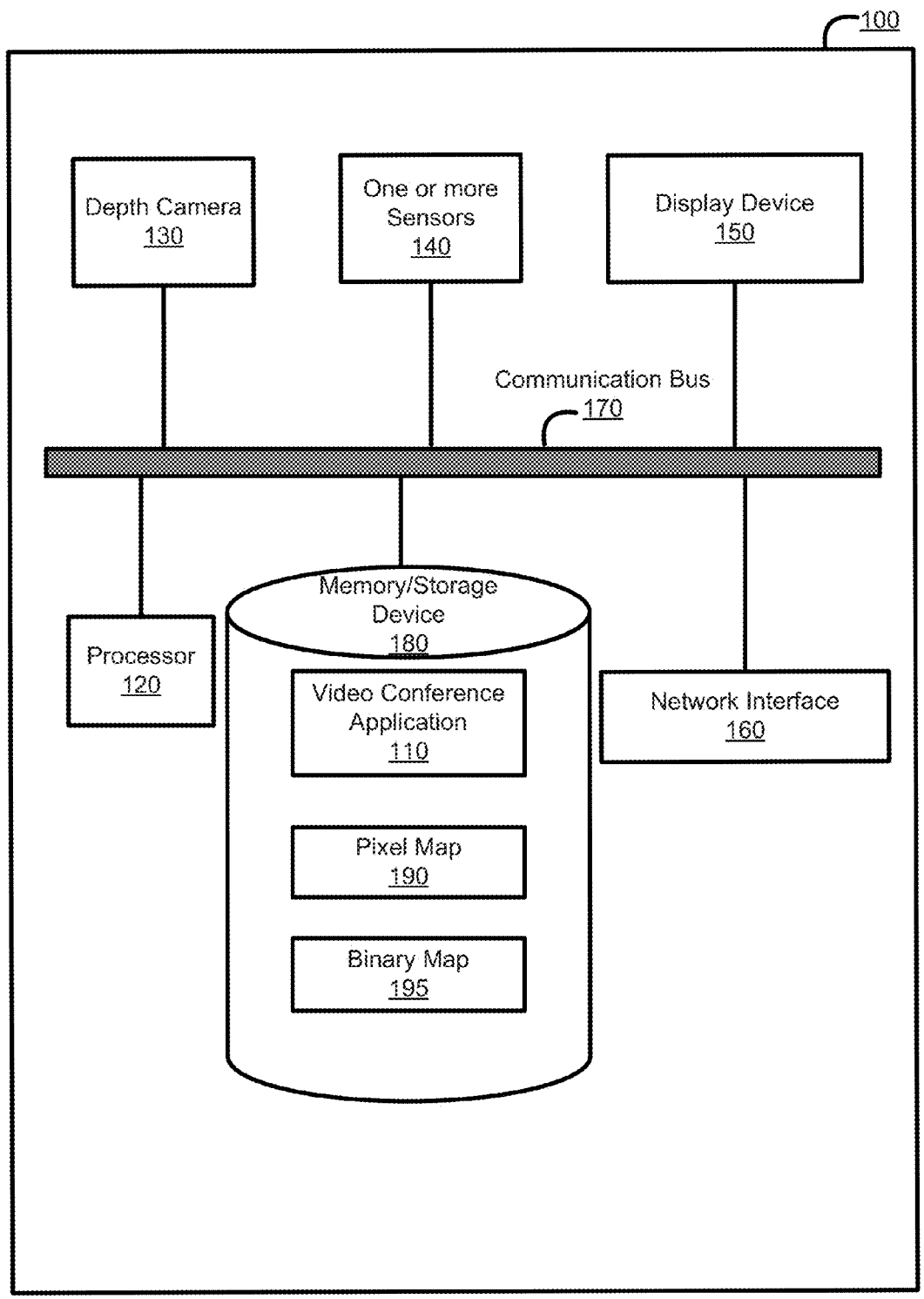
FIG. 1 illustrates a block diagram of a machine with one or more depth cameras and one or more sensors according to an embodiment of the invention.

FIG. 1 illustrates a block diagram of a machine 100 with one or more depth cameras 130 and one or more sensors 140 according to an embodiment of the invention. In one embodiment, the machine 100 is a desktop, laptop/notebook, netbook, and/or any other computing device. In another embodiment, the machine 100 is a video conference center and/or the machine 100 is included as part of the video conference center.

As illustrated in FIG. 1, the machine 100 includes a processor 120, a network interface 160, a display device 150, one or more depth cameras 130, one or more sensors 140, a memory/storage device 180, and a communication bus 170 for the machine 100 and/or one or more components of the machine 100 to communicate with one another. Additionally, as illustrated in FIG. 1, the storage device 160 stores a video conference application 110, a pixel map 190, and a binary map 195. In other embodiments, the machine 100 includes additional components and/or is coupled to additional components in addition to and/or in lieu of those noted above and illustrated in FIG. 1.

Further, as illustrated in FIG. 1, the machine 100 includes a processor 120 coupled to the machine 100. The processor 120 sends data and/or instructions to the components of the machine 100, such as one or more depth cameras 130 and a video conference application 110. Additionally, the processor 120 receives data and/or instruction from components of the machine 100, such as one or more depth cameras 130, and the video conference application 110.

The video conference application 110 is an application that can be utilized in conjunction with one or more depth cameras 130 to determine distances of objects captured by one or more depth cameras 130 by determining distances of pixels that correspond to the objects. The pixels that correspond to the objects correspond to points on the objects. Additionally, the video conference application 110 controls one or more depth cameras 130 and/or one or more sensors 140 in identifying a head or face portion of a participant so as to align a region of interest on the participant and crop the region of interest from a captured video stream of the participant. Further, the video conference application 110 arranges the cropped video stream of the participant with additional cropped video streams of participants for displaying a video conference on the display device 150.

In one embodiment, the video conference application 110 is firmware that is embedded onto the machine 100. In other embodiments, the video conference application 110 is a software application stored on the machine 100 within ROM or on a storage device 180 accessible by the machine 100 or the video conference application 110 is stored on a computer readable medium readable and accessible by the machine 100 from a different location. Additionally, in one embodiment, the storage device 180 is included in the machine 100. In other embodiments, the storage device 180 is not included in the machine, but is accessible to the machine 100 utilizing a network interface 160 included in the machine 100. The network interface 100 may be a wired or wireless network interface card.

In a further embodiment, the video conference application 110 is stored and/or accessed through a server coupled through a local area network or a wide area network. The video conference application 110 communicates with devices and/or components coupled to the machine 100 physically or wirelessly through a communication bus 170 included in or attached to the machine 100. In one embodiment the communication bus 170 is a memory bus. In other embodiments, the communication bus 170 is a data bus.

As noted above, one or more depth cameras 130 are cameras that can be configured to determine the distance (depth) of pixels that correspond to objects within a viewing area of one or more depth cameras 130. The viewing area includes all of the objects, and the pixels corresponding to the objects, that one or more depth cameras 130 can capture and view. Additionally, for the purposes of this application, objects include at least one from the group consisting of one or more participants and/or one or more background objects.

Further, one or more depth cameras 130 concurrently capture video streams of one or more participants and/or one or more background objects within the viewing area while concurrently determining the positions and distance of the pixels corresponding to the objects. Further, one or more depth cameras 130 can be positioned in different areas around the machine 100. In one embodiment, one or more depth cameras 130 are mounted on a display device 150.

When one or more depth cameras 130 are viewing the objects within the viewing area, one or more depth cameras 130 additionally capture all of the pixels that correspond to the objects within the viewing area. As noted above, the pixels that correspond to the objects correspond to points on the objects. By viewing the pixels which correspond to the objects within the viewing area, one or more depth cameras 130 can determine a distance of each pixel of each object within the viewing area. One or more depth cameras 130 can determine the distance of all of the pixels within the viewing area, one by one or all at the same time.

In one embodiment, one or more depth cameras 130 can utilize a rangefinder to identify the distance of the objects within the viewing area. Additionally, the rangefinder utilizes sonar, laser, stereo, and/or radar. In another embodiment, one or more of the depth cameras 130 emit light pulses to be reflected from the pixels. Further, one or more depth cameras 130 can calculate the position and the distance of the pixels utilizing an amount of time measured for the light pulses to return to the corresponding depth cameras 130 from the corresponding pixels. In other embodiments, one or more depth cameras 130 can utilize additional methods and or techniques in identifying the positions and the distances of the pixels within the viewing area.

Once the distances of all of the pixels within the viewing area have been determined, a video conference application 110 then classifies all of the pixels as either foreground pixels or background pixels. In one embodiment, before classifying the pixels, the video conference application 110 initially creates a pixel map 190 of all of the pixels within the viewing area. The pixel map 190 includes all of the pixels that one or more depth camera 130 has captured and viewed. Additionally, the video conference application 110 assigns each of the pixels included in the pixel map 190 a corresponding distance as determined by one or more depth cameras 130 and a coordinate.

In classifying the pixels as foreground pixels or background pixels, the video conference application 110 compares the distances of each pixel measured by one or more depth cameras 130 to a predefined threshold distance. For the purposes of this application, a participant would frequently be located closer to one or more depth cameras 130 than the predefined threshold distance. If the pixels have a measured distance less than the predefined threshold distance, the video conference application 110 will label the corresponding pixels as foreground pixels. Additionally, if the pixels have a measured distance greater than or equal to the predefined threshold distance, the video conference application 110 will label the corresponding pixels as background pixels.

As a result, the pixels that correspond to the participant will be classified as foreground pixels and the participant will be included in the foreground. In one embodiment, the video conference application 110 will also create a binary map 195 or mask of the foreground pixels and the background pixels. The video conference application 110 will display and identify the foreground pixels on the binary map 195 with a 1 and will display and identify the background pixels with a 0. As a result, the video conference application 110 can accurately and clearly identify where the foreground pixels are located and where the participant is with the pixel map 190 and/or the binary map 195.

Once the video conference application 110 has identified all of the foreground pixels and their corresponding coordinates, the video conference application 110 will proceed to create a region of interest and align the region of interest with a head portion of the participant on the pixel map 190 or binary map 195. As will be illustrated in FIG. 2, the region of interest includes foreground pixels that correspond to a head portion of the participant and foreground pixels that correspond to a torso portion of the participant. In one embodiment, the region of interest is rectangular and includes the foreground pixels that correspond to the participant as well as some background pixels. In another embodiment, the region of interest includes the foreground pixels without any of the background pixels.

If the region of interest includes the foreground pixels without background pixels, the empty areas surrounding the foreground pixels in the region of interest can be populated with transparent pixels and/or common background pixels. Alternatively, the video conference application can label the background pixels as transparent to not display them or mark them for replacement with the common background pixels. The common background pixels can be any color, create any pattern, and can be utilized as a common background for the participant and other additional participants.

Additionally, in one embodiment, the region of interest will have a predefined default size, with a predefined participant head size and a predefined participant distance. In other embodiments, a size of the region of interest can be modified in response to a distance of the participant, a head portion size of the participant, and techniques used in probability and analysis, such as a second moment method of the foreground pixels corresponding to the participant.

In one embodiment, if the video conference application 110 determines that the head size of the participant is larger than a predefined participant head size or if the participant is closer to one or more depth cameras 130 than the predefined participant distance, the video conference application can, in response, increase the size of the region of interest to insure that all of the foreground pixels corresponding to the participant's head and participant's torso are included in the region of interest. In another embodiment, if the video conference application 110 determines that the head size of the participant is smaller than a predefined participant head size or if the participant is farther to one or more depth cameras 130 than the predefined participant distance, the video conference application can, in response, decrease the size of the region of interest to reduce an amount of background pixels included in the region of interest.

As noted above, the pixels corresponding to the participant will be included in the foreground pixels shown in the pixel map 190 or the binary map 195. As a result, the distance of the participant can be determined utilizing distances corresponding to one or more foreground pixels. Alternatively, in one embodiment, the distance of the participant can be predefined. The video conference application 110 can use knowledge of an average participant head size in conjunction with the known distance of the participant to create a size for the region of interest. In another embodiment, knowledge of the average human head size can be used in conjunction with distances measured from the foreground pixels to generate an expected participant head size in the image.

Further, the video conference application 110 can estimate second order moments of the foreground pixels and modify the size of the region of interest in response to a location, a pattern, and/or a number of the foreground pixels on the pixel map 190. The second order moments can establish a probable size and/or distance of the participant. As a result, the video conference application can modify the size of the region of interest accordingly. Once the size of the region of interest has been established, the video conference application 110 can proceed to align the region of interest with a head portion or face portion of the participant on the pixel map 190. Once the video conference application 110 has determined a location of the head portion or face portion of the participant, utilizing known positions of all of the pixels included in the pixel map 190, the video conference application 110 will be able to accurately align the region of interest on the captured video stream of the participant.

In aligning the region of interest with the head portion of the participant, in one embodiment, the video conference application 110 determines where the highest foreground pixels on the pixel map 190 or binary map 195 are located. In one embodiment, the video conference application 110 can determine that this is where the head portion of the participant is begins and align the region of interest around the highest foreground pixels on the pixel map 190 so that the participant head and participant torso are included in the region of interest.

Further, in one embodiment, one or more depth cameras 130 are additionally utilized in identifying a face position of the participant for aligning the region of interest with the head portion of the participant. In another embodiment, one or more sensors 140 are additionally used independently and/or in conjunction with one or more depth cameras 130 to identify the face position of one or more participants. One or more sensors 140 are devices configured to detect a location of one or more participants' face and/or priority levels of the participant.

In one embodiment, one or more sensors 140 are infrared devices configured to identify a location of the participant's eyes. Utilizing the data from the location of the participant's eyes, one or more sensors 140 and the video conference application 110 can determine the location of the participant's face on the pixel map 190, binary map 195 and/or the video stream of the participant. In another embodiment, one or more sensors 140 are additional cameras configured to detect the participant's face utilizing face recognition technology. In other embodiments, the face recognition technology is a software application. Further, in additional embodiments, one or more sensors 140 are proximity sensors configured to detect proximities of one or more objects and/or one or more participants.

As noted above, one or more depth cameras 130 also capture video streams of the participant. In other embodiments, additional cameras can be utilized to capture video streams. Utilizing the identified size of the region of interest, as well as where to align the region of interest on the pixel map 190 or the binary map 195, the video conference application 110 can align the region of interest with the location of the participant's head on the captured video stream. The alignment is done based on the face or head position of the participant in an initial calibration step. In other embodiments, the calibration step can be based on an average face position of the participant over time. As a result, when the participant moves his/her head, the motion can be accurately captured and displayed. The video conference application 110 can then crop the region of interest from the captured video stream to create a cropped video stream of the participant's head and torso.

As noted above, in one embodiment, transparent pixels or common background pixels are used to replace the background pixels to create an appearance of a common background around the participant in the cropped video stream. This approach of utilizing common background pixels can be used for the cropped video stream of the participant and for additional cropped video streams of additional participants. Utilizing the cropped video stream of the corresponding participant and additional cropped video streams of additional participants, the video conference application 110 can arrange the cropped video streams for display as a video conference on the display device 150.

The video conference includes one or more cropped video streams displaying the participant and additional participants. The video conference can be displayed on a display device 150 coupled to the machine 100. The display device 150 is a device that can create and/or project one or more images and/or videos for display. In one embodiment, the display device 150 is a monitor and/or television. In other embodiments, the display device 150 is a projector that can project one or more images and/or videos.

As noted above, the video conference application 110 arranges the cropped video streams of the participants for displaying the video conference. Additionally, the video conference application 110 can arrange and/or rearrange the cropped video streams in the video conference based on a corresponding priority level of each participant. In some embodiments, priority levels of each participant indicate how active the corresponding participant is in the video conference. The activity levels of the participants can be determined automatically using one or more depth cameras 130 and/or one or more sensors 140. In other embodiments, the priority level corresponds to attention levels of the participants derived from eye gaze, or from an organizational rank, or from other additional parameters input by each participant.

Further, in one embodiment, in arranging the cropped the video streams, the video conference application 110 initially scales one or more of the cropped video streams to a common size. Additionally, in one embodiment, the video conference application can partition a viewing area of the view conference into a priority area and a non-priority area. In one embodiment, the cropped video streams of the participants classified with a priority level greater than 0 are populated in the priority area. Additionally, the cropped video streams of the participants classified with a priority level of 0 are populated into the non-priority area.

Further, in arranging and/or rearranging the cropped video streams, the video conference application 110 can scale down cropped video streams corresponding to participants having a priority level of 0. The cropped video streams can be scaled to different sizes based on the participants' corresponding priority level. In one embodiment, the lower the priority level, the more the cropped video stream of the corresponding participant is scaled down. Further, cropped video streams of participants classified with a low priority can also be further cropped or re-cropped. In one embodiment, the cropped video streams of participants classified with a low priority, such as 0, can be further re-cropped to display the head portion of the participants classified with a low priority level. In other embodiments, the cropped video streams of the participants classified with a low priority level, can be further cropped horizontally to display the participant's head and part of their torso.

Figure 2:
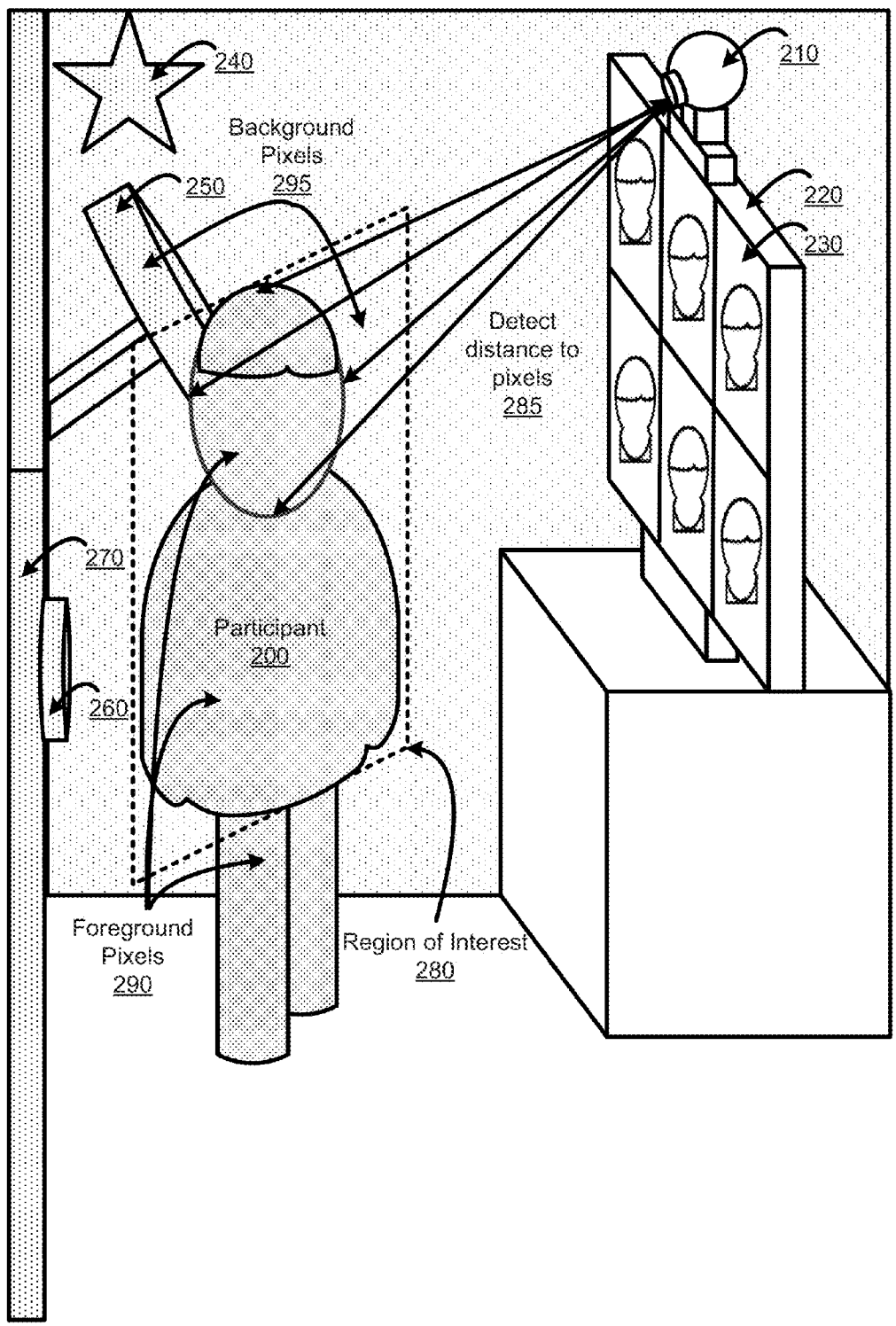
FIG. 2 illustrates a depth camera capturing a video stream of a participant and detecting distances of pixels corresponding to objects within a viewing area of the depth camera according to an embodiment of the invention.

FIG. 2 illustrates a depth camera 210 capturing a video stream of a participant 200 and detecting distances of pixels 285 corresponding to objects (200, 240, 250, 260, and 270) within a viewing area of the depth camera 210 according to an embodiment of the invention. As noted above, the depth camera 210 is a camera that can be configured to determine the distance (depth) of pixels that correspond to objects within a viewing area of the depth camera 210. Additionally, as noted above, the viewing area includes all of the objects (200, 240, 250, 260, and 270) that one or more depth cameras 130 can capture and view.

As illustrated in FIG. 2, in one embodiment, the viewing area includes objects 200, 240, 250, 260, and 270. As a result, the depth camera 210 views and captures the pixels corresponding to objects 200, 240, 250, 260, and 270. Additionally, as illustrated in FIG. 2, the depth camera 210 determines the distance of the pixels 285 corresponding to the objects. In one embodiment, as noted above, a video conference application will compare the measured distances corresponding to each pixel and compare them to a predefined threshold distance. If the pixels have a measured distance less than the predefined threshold distance, the video conference application will label the corresponding pixels as foreground pixels 290. Additionally, if the pixels have a measured distance greater than or equal to the predefined threshold distance, the video conference application will label the corresponding pixels as background pixels 295.

As illustrated in FIG. 2, in one embodiment, the pixels corresponding to object (participant) 200 have been classified as foreground pixels 290. Additionally, the pixels surrounding object (participant) 200 have been classified as background pixels 295, this includes the pixels corresponding to objects 240, 250, 260, and 270. As noted above and illustrated in FIG. 2, a participant is frequently located closer to one or more depth cameras 130 than the predefined threshold distance and as a result, the pixels corresponding to the participant are classified as foreground pixels 290.

Additionally, as noted above, in one embodiment, the video conference application will create a pixel map including all of the pixels captured by the depth camera 210. Each of the pixels included in the pixel map will include a corresponding distance and coordinate. Further, in another embodiment, the video conference application can create a binary map representing the foreground pixels 290 with a 1 and the background pixels 295 with a 0. Utilizing the pixel map or the binary map, the location and position of the foreground pixels 290 can accurately be determined. As a result, the location of the participant can be determined as well.

Further, as illustrated in FIG. 2, a region of interest 280 can be created and aligned with a head portion of the participant. Additionally, as noted above and illustrated in FIG. 2, the region of interest 280 is rectangular and includes foreground pixels 290 and background pixels 295. Further, as illustrated in FIG. 2, the region of interest 280 includes a head portion of the object (participant) 200 and a torso portion of the object (participant) 200. As noted previously, the region of interest has a default size. However, the size of the region of interest can be modified in response to a distance of the participant, a head portion size of the participant, and techniques used in probability and analysis, such as a second moment method of the foreground pixels 290 corresponding to the object (participant) 200. The size of the region of interest 280 can be increase to include all of the foreground pixels 290 or decreased to exclude unwanted background pixels 295.

In addition, as illustrated in FIG. 2, in one embodiment, the depth camera 210 can identify the top portion of the object (participant) 200 since any of the pixels corresponding to objects above or around the head portion of the object (participant) 200 have a distance greater than the foreground pixels 290 and are classified as background pixels 295. In other embodiments, the video conference application can utilize predefined values of head sizes of what dimensions a typical participant head may be. Combined with the measured distances from the depth camera 210, the size of the participant's head can be estimated or inferred.

As noted above, in one embodiment, the depth camera 210 can be used in locating the head portion of object (participant) 200. In another embodiment, one or more sensors can be utilized independently or in conjunction with the depth camera 210 to locate the head portion or eyes of object (participant) 200. In other embodiments, face recognition hardware or software can be used in conjunction with the depth camera 210 to locate the face of object (participant) 200. Using any of the previously disclosed methods or techniques, the region of interest 280 can be aligned with the head portion of the object (participant) 200. Once the region of interest 280 has been defined, created, and aligned, the region of interest 280 can be cropped from a captured video stream of the participant 200 and included in a video conference 230 displayed on the display device 220.

Figure 3:
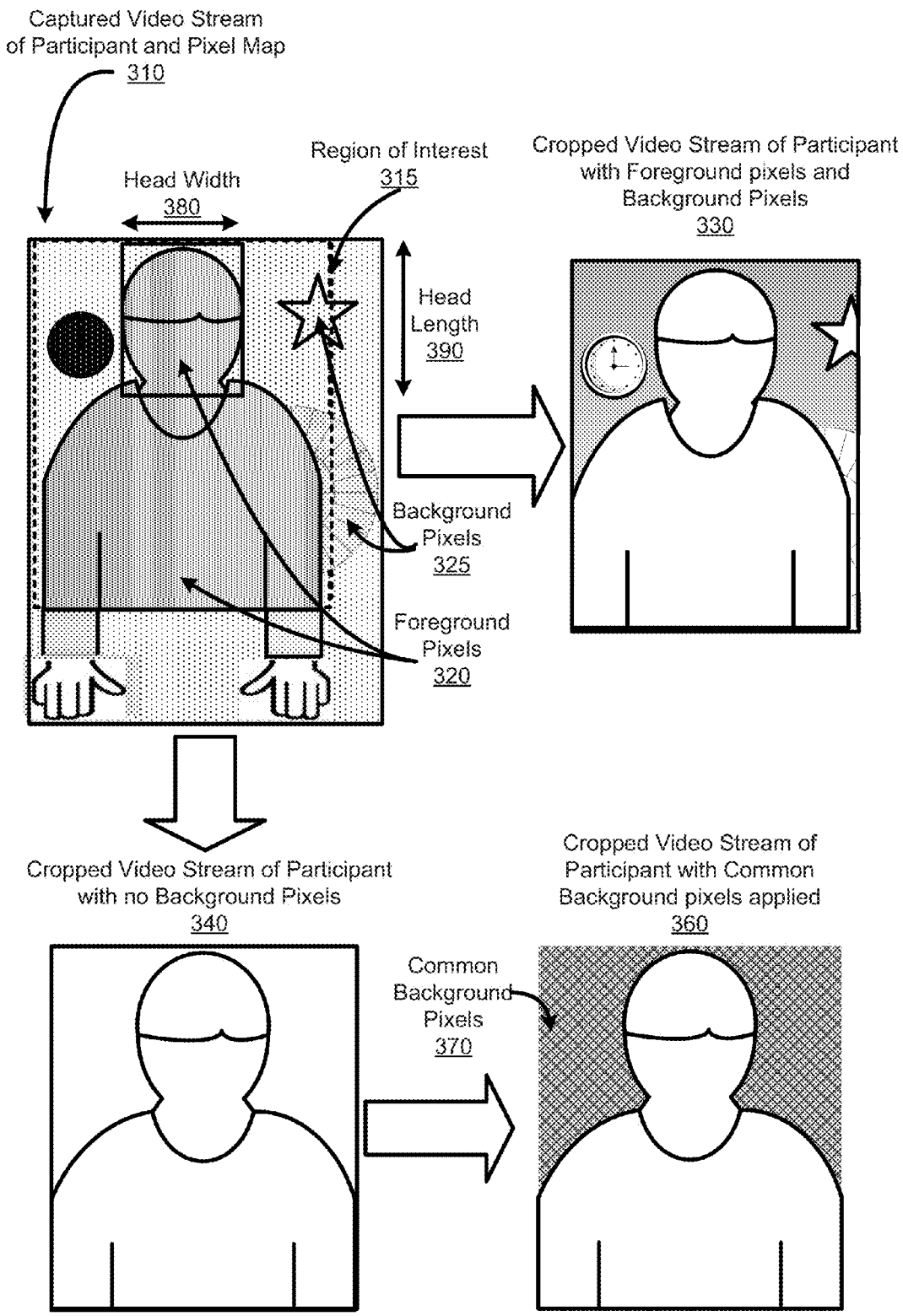
FIG. 3 illustrates a region of interest being cropped from a captured video stream of a participant according to an embodiment of the invention.

FIG. 3 illustrates a region of interest 315 being cropped from a captured video stream of a participant 310 according to an embodiment of the invention. As noted above, one or more depth cameras are used in capturing a video stream 310 of the participant. Additionally, as illustrated in FIG. 3, in one embodiment, a pixel map 310 of a viewing area of one or more depth cameras can be created. As noted above and illustrated in FIG. 3, the pixel map 310 includes foreground pixels 320 and background pixels 325. Additionally, all of the pixels included in the pixel map 310 include a corresponding coordinate and distance.

Further, in one embodiment, as illustrated in FIG. 3, the pixel map 310 can be imposed over the captured video stream of the participant 310 so as to determine where on the captured video stream 310 the foreground pixels 320 correspond to. This information can be utilized by a video conference application to resize a region of interest 315 and align the region of interest 315 with a head portion of a participant. Additionally, this information can be utilized to determine where on the captured video stream of the participant 310 to crop. As noted previously, the region of interest 315 includes a head portion and a torso portion of the participant. As illustrated in FIG. 3, the region of interest 315 is shown with dotted lines.

As noted above, the size of the region of interest 315 can be scaled up or down in response to the participant's distance from a depth camera, the participant's head size, and/or a second moment method determined from the foreground pixels corresponding to the participant. As illustrated in FIG. 3, in one embodiment, the size of the region of interest 315 has been modified in response to the head size (head width 380 and a head length 390 of the participant). As illustrated in FIG. 3, the region of interest 315 can be cropped from the captured video stream of the participant 310.

As illustrated in FIG. 3, in one embodiment, the region of interest 315 includes background pixels 325. As a result, in the present embodiment, when the video conference application crops the region of interest 315 from the captured video stream 310, the created cropped video stream 330 includes foreground pixels 320 and background pixels 325. As noted above, the foreground pixels 320 correspond to the participant.

In another embodiment, as noted above, the background pixels 325 included in the region of interest 315 can be marked as transparent. As a result, when the region of interest 315 is cropped from the captured video stream 310 and the background pixels 325 have been replaced, the cropped video stream 340 displays the foreground pixels 320 corresponding to the participant and none of the background pixels 325.

Additionally, in other embodiments, the background pixels 325 included in the region of interest 315 can be replaced with common background pixels 370. As noted above, the common background pixels 370 can include any color and create any design, pattern, and/or any image. As a result, the common background pixels 370 can be applied to cropped video stream 340 to create a cropped video stream of the participant with common background pixels applied 360.

Figure 4:
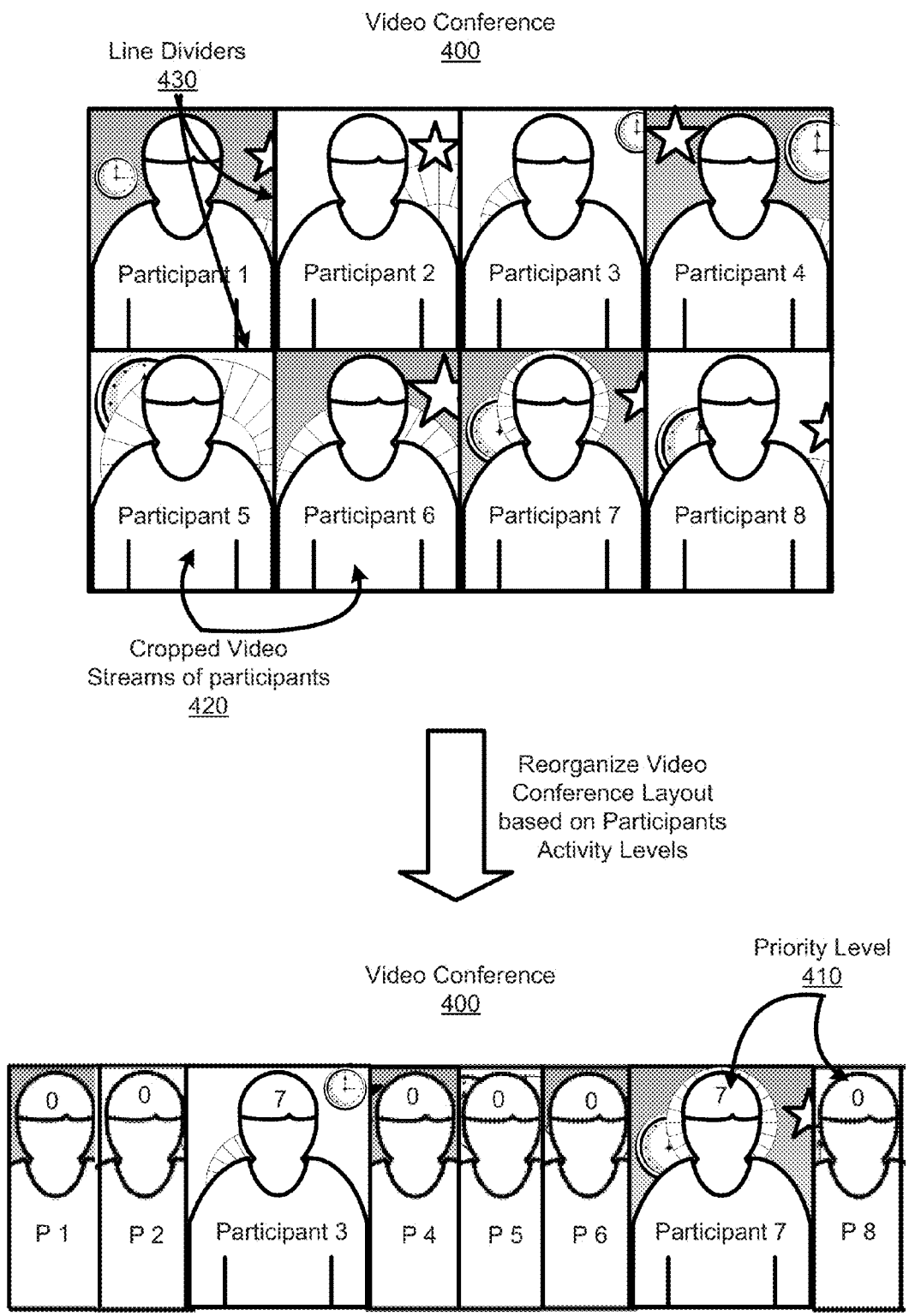
FIG. 4 illustrates cropped video streams of participants being arranged and rearranged for a video conference according to an embodiment of the invention.

FIG. 4 illustrates cropped video streams of participants 420 being arranged and rearranged for a video conference 400 according to an embodiment of the invention. Further, as illustrated in FIG. 4, in one embodiment, the cropped video streams of the participants 420 include both the foreground pixels and the background pixels from the region of interest. As noted above, the pixels corresponding to the participant are included in the foreground pixels.

As noted above, the cropped video streams of the participants 420 are created by a video conference application cropping regions of interest from corresponding captured video streams of each participant. As illustrated in FIG. 4, the cropped video streams of the participants 420 are arranged side by side for the video conference 400. Further, in one embodiment, as illustrated in FIG. 4, the cropped video streams of the participants 420 arranged in the video conference 400 are separated from one another with line dividers 430.

In one embodiment, as illustrated in FIG. 4, the video conference application initially arranges the cropped video streams of the participants 420 into two rows. The first row includes cropped video streams for participants 1 through 4. Additionally, the second row includes cropped videos streams for participants 5 through 8. Further, as illustrated in FIG. 4, the cropped video streams of the participants 420 shown in the video conference 400 can be rearranged in response to priority levels 410 of the participants. As noted above, the priority levels 410 of the participants can be manually defined by each participant or automatically determined by one or more depth cameras and/or one or more sensors.

As shown in FIG. 4, in one embodiment, the cropped video streams of the participants 420 can be further cropped and rearranged in a single row where participants with low priority levels 410 are further cropped horizontally. As shown in FIG. 4, Participants 3 and 7 have a priority level 410 of 7 and the remaining participants have priority levels of 0. As a result, as illustrated in FIG. 4, the cropped video stream of the participants with the highest activity level 410, Participants 3 and 7, are not re-cropped. However, the cropped video streams of the participants with the lowest priority levels 410, Participants 1, 2, 4, 5, 6, and 8 are further cropped horizontally.

Figure 5:
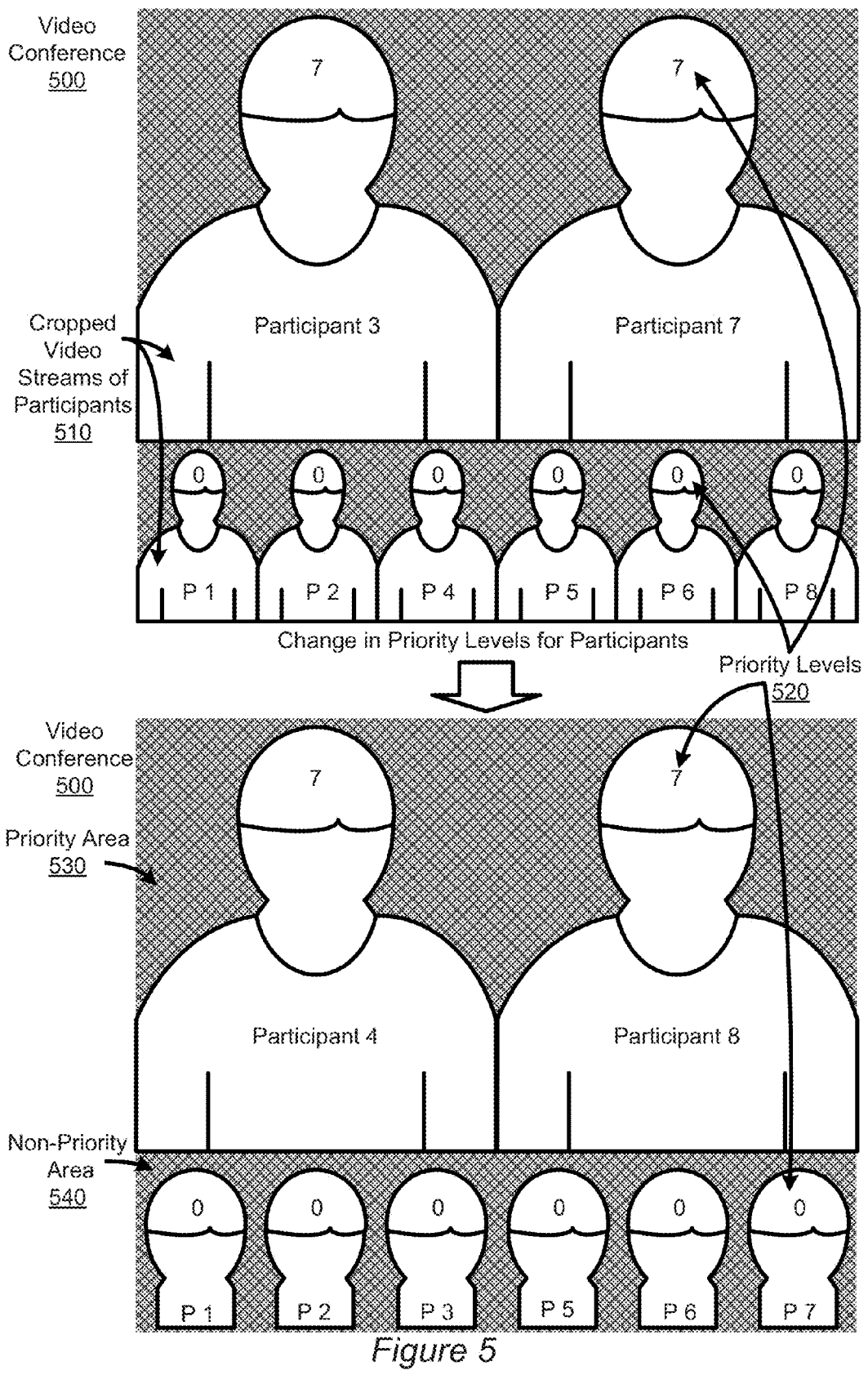
FIG. 5 illustrates a video conference being rearranged according to an embodiment of the invention.

FIG. 5 illustrates a video conference 500 being rearranged according to an embodiment of the invention. As noted above, the video conference 500 includes cropped video streams of participants 510. As illustrated in FIG. 5, in one embodiment, one or more cropped video streams of the participants 510 can be scaled down in response to their corresponding priority levels 520. As a result, FIG. 5 illustrates the cropped video streams of participants 3 and 7 being scaled up, while the cropped video streams of participants 1, 2, 4, 5, 6, and 8, being scaled down.

Additionally, as illustrated in FIG. 5 and noted above, in one embodiment, the cropped video streams of participants 510 do not display background pixels around the participants. Additionally, as noted above, common background pixels can be used to replace the background pixels and are applied to the cropped video streams of the participants 510. Further, in one embodiment, as illustrated in FIG. 5, no dividing lines are used for the video conference 500.

As noted previously, the video conference 500 can be rearranged when priority levels 520 of any of the participants change during the video conference 500. In rearranging the video conference 500, one or more of the cropped video streams of the participants 510 are scaled up or down in response to changes in priority levels 520 of one or more participants. Additionally, as noted above, the video conference 500 can be arranged in various ways in response to the priority levels 520 of the participants.

As illustrated in FIG. 5, in one embodiment, the priority levels 520 of Participants 3 and 7 have been reclassified from 7 to 0. Additionally, the activity levels 520 of Participants 4 and 8 have been reclassified from 0 to 7. As a result, two Participants are reclassified as having a high priority and the remaining Participants are reclassified as or remain with a low priority level. Additionally, as illustrated in FIG. 5 and noted above, in one embodiment, the video conference 500 is further partitioned into a priority area 530 and a non-priority area 540.

The cropped video streams of Participants 510 classified as with a high priority level are populated into the priority area 530 and the cropped video streams of Participants 510 classified with a low priority level are populated into the non-priority area 540. As a result, the cropped video streams corresponding to Participants 4 and 8, reclassified with a priority level of 7, will be populated into the priority area 530. Additionally, the cropped video streams corresponding to Participants 1, 2, 3, 5, 6, and 7, reclassified with a priority level of 0, will be populated into the non-priority area 540.

In one embodiment, as illustrated in FIG. 5, if a few participants are classified with a high priority level (in the present embodiment, 2), a video conference application can rearrange the video conference 500 such that the corresponding cropped video streams of Participants 4 and 8 are scaled up and the corresponding cropped video streams of Participants 1, 2, 3, 5, 6, and 7 are further cropped. Additionally, as illustrated in FIG. 5 and noted above, the cropped video streams can further be cropped by the video conference application to display head portions of the participants classified with a low priority.

As shown in FIG. 5, the cropped video streams corresponding to Participants 1, 2, 3, 5, 6, and 7 are further cropped to include head portions of the corresponding participants. Further, the cropped video streams of Participants 4 and 8, having equal activity levels 510 of 7, are scaled up equally to bring more attention to them. In other embodiments, additional cropping or scaling options can be applied to the cropped video streams of the participants 510 in addition to and/or in lieu of those noted above and displayed in FIG. 5.

Figure 6:
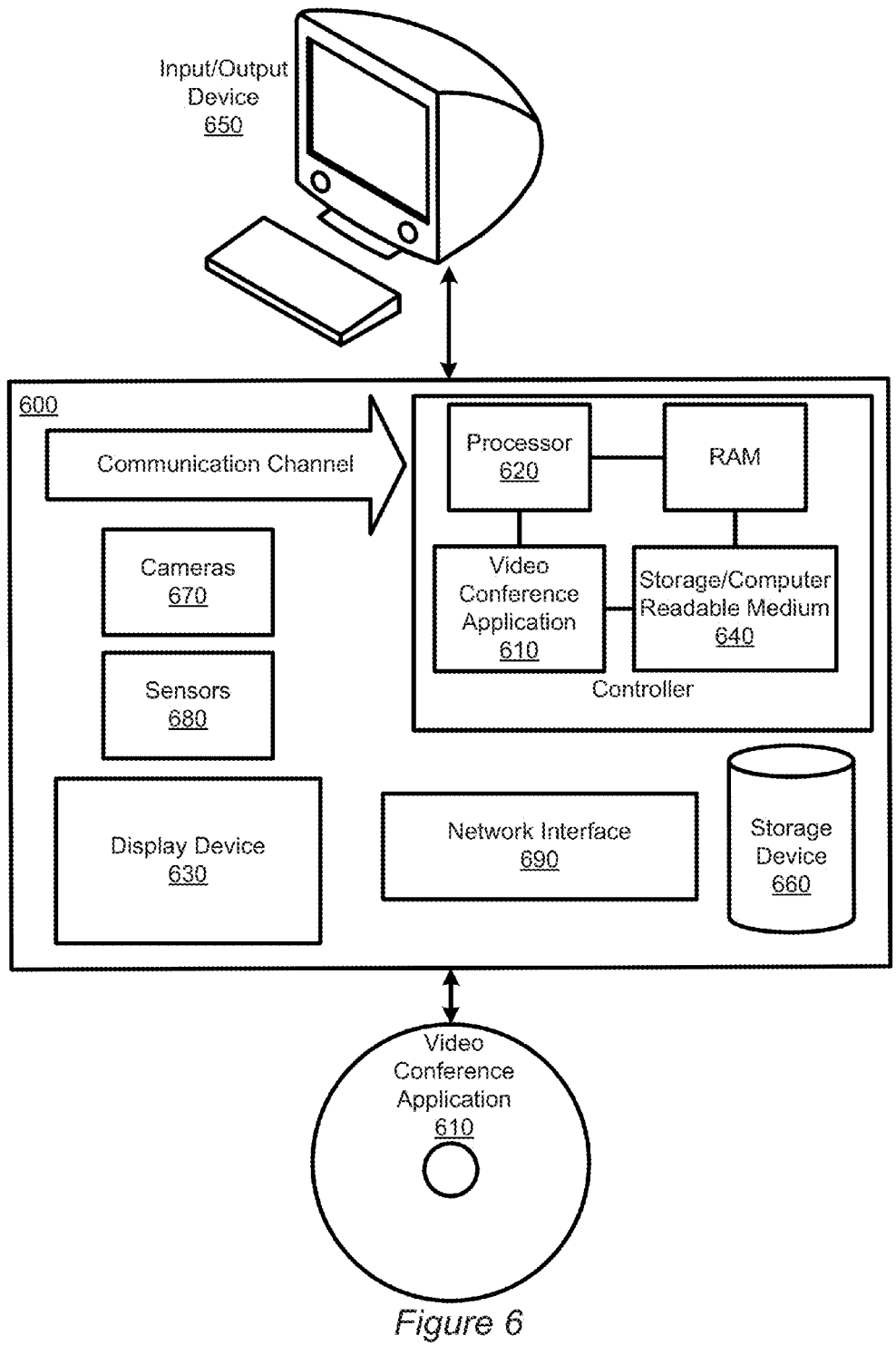
FIG. 6 illustrates a machine with an embedded Video Conference Application and a Video Conference Application stored on a removable medium being accessed by the machine according to an embodiment of the invention.

FIG. 6 illustrates a machine 600 with an embedded Video Conference Application 610 and a Video Conference Application 610 stored on a removable medium being accessed by the machine 600 according to an embodiment of the invention. For the purposes of this description, a removable medium is any tangible apparatus that contains, stores, communicates, or transports the application for use by or in connection with the machine 600. As noted above, in one embodiment, the Video Conference Application 610 is firmware that is embedded into one or more components of the machine 600 as ROM. In other embodiments, the Video Conference Application 610 is a software application which is stored and accessed from a hard drive, a compact disc, a flash disk, a network drive or any other form of computer readable medium that is coupled to the machine 600.

Figure 7:
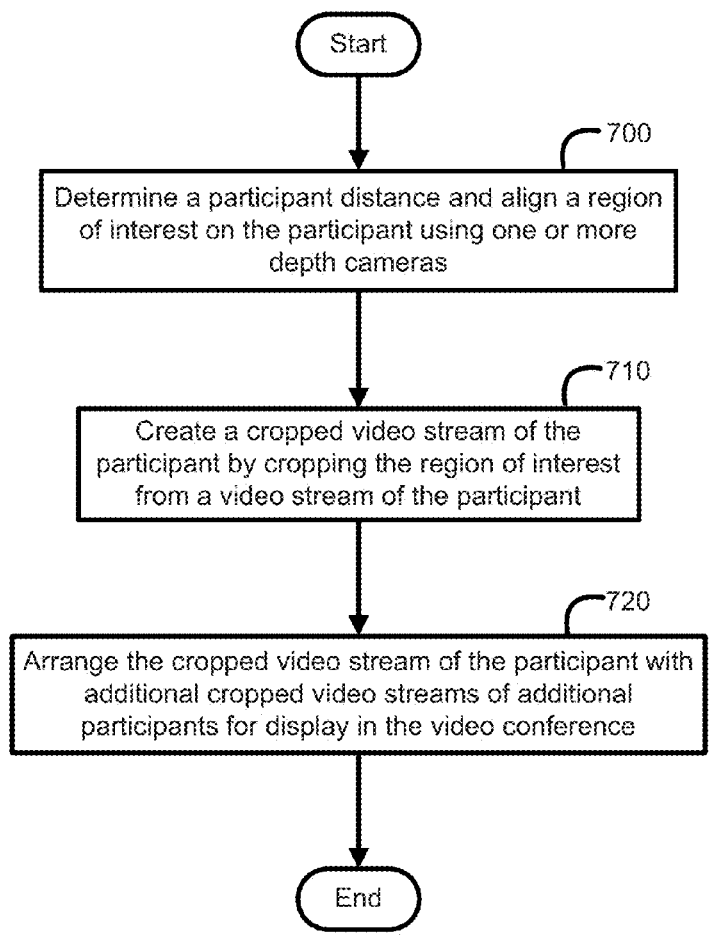
FIG. 7 is a flow chart illustrating a method for presenting participants in a video conference according to an embodiment of the invention.

FIG. 7 is a flow chart illustrating a method for presenting participants in a video conference according to an embodiment of the invention. The method of FIG. 7 uses a machine coupled to one or more depth cameras, one or more sensors, a display device, and a video conference application. In other embodiments, the method of FIG. 7 uses additional components and/or devices in addition to and/or in lieu of those noted above and illustrated in FIGS. 1, 2, 3, 4, 5, and 6.

The video conference application initially utilizes one or more depth cameras to determine a participant distance and align a region of interest on the participant 700. As noted above, in determining the participant distance, the video conference application instructs one or more depth cameras to capture pixels corresponding to objects within a viewing area of one or more depth cameras. Additionally, the video conference application creates a pixel map and determines distances of the pixels within the viewing area of one or more depth cameras. Further, the video conference application assigns each of the pixels a coordinate on the pixel map. Utilizing the known distances, the video conference application classifies pixels having a distance less than a predefined threshold distance as foreground pixels and labels pixels having a distance equal to or greater than the predefined threshold distance as background pixels.

Additionally, the video conference application can create a region of interest with a default size and modify the size of the region of interest in response to a head size of the participant, a distance of the participant, and/or a second moment of the foreground pixels. As noted above, the region of interest includes the foreground pixels corresponding to a head portion of the participant and a torso portion of the participant. Further, one or more sensors can additionally be utilized by the video conference application to align the region of interest with the head portion of the participant.

While one or more depth cameras are identifying the participant and aligning the region of interest, one or more depth cameras and/or one or more additional cameras are concurrently capturing a video stream of the participant. Once the region of interest has been aligned with the head portion of the participant, the video conference application creates a cropped video stream of the participant by cropping the region of interest from a video stream of the participant 710. As noted previously, with the information from the pixel map and/or a binary map representing the location of the foreground pixels, the video conference application can accurately determine where on the captured video stream to align and crop the region of interest.

Once the region of interest has been cropped from the video stream, the video conference application will arrange the cropped video stream of the participant with additional cropped video streams of additional participants for display in the video conference 720. Additionally, the video conference application can rearrange the cropped video streams, as well as modify them, for the video conference. In other embodiments, the method of FIG. 7 includes additional steps in addition to and/or in lieu of those depicted in FIG. 7.

Figure 8:
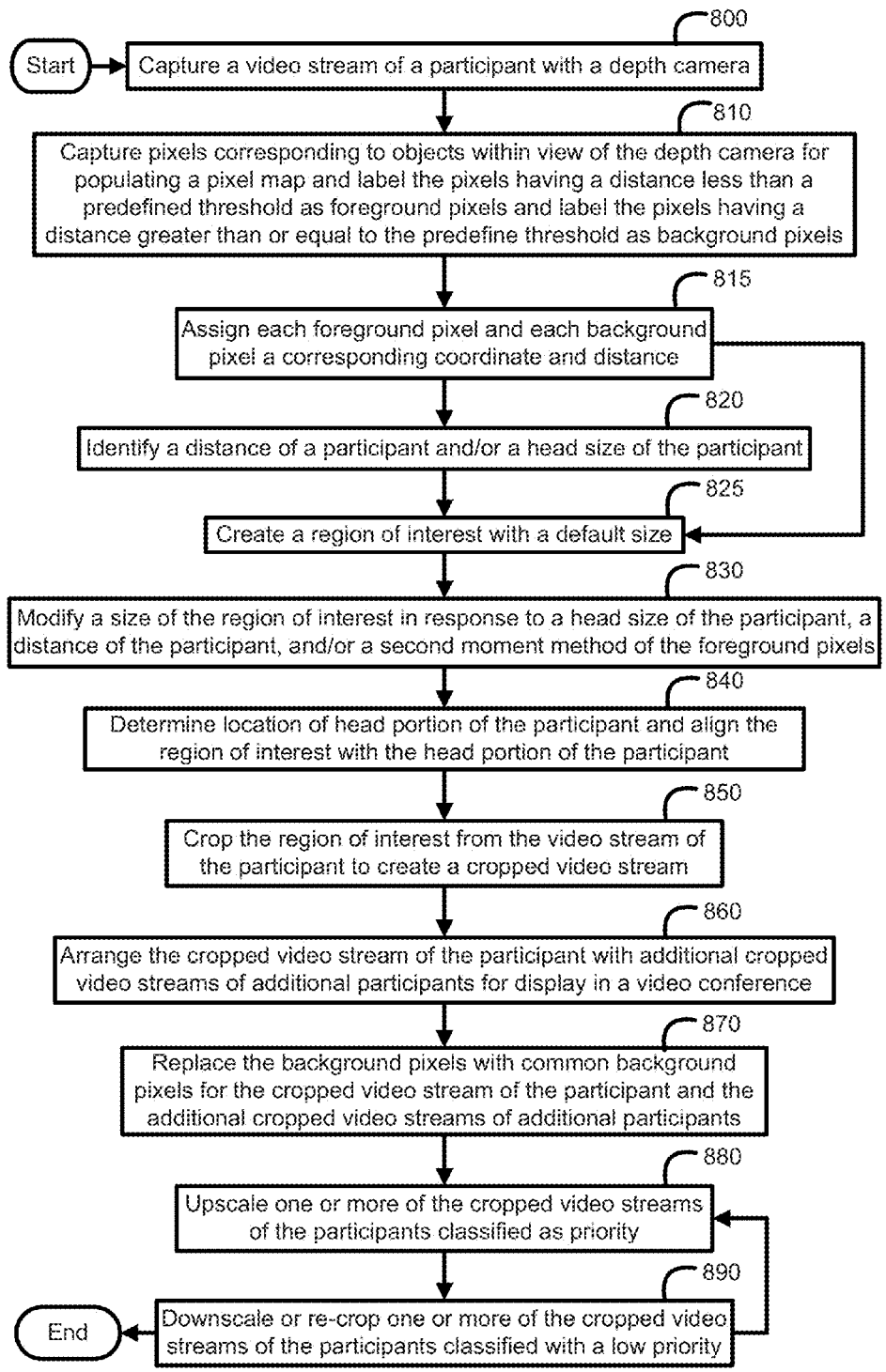
FIG. 8 is a flow chart illustrating a method for presenting participants in a video conference according to another embodiment of the invention.

FIG. 8 is a flow chart illustrating a method for presenting participants in a video conference according to another embodiment of the invention. Similar to the method disclosed in FIG. 7, the method of FIG. 8 uses a machine coupled to one or more depth cameras, one or more sensors, a display device, and a video conference application. In other embodiments, the method of FIG. 8 uses additional components and/or devices in addition to and/or in lieu of those noted above and illustrated in FIGS. 1, 2, 3, 4, 5, and 6.

As noted above, the video conference application initially captures a video stream of a participant with one or more depth cameras 800. While capturing the video stream of the participant, the video conference application will concurrently capture pixels corresponding to objects within a viewing area of the depth camera for populating a pixel map and label the pixels having a distance less than a predefined threshold as foreground pixels and label the pixels having a distance greater than or equal to the predefine threshold as background pixels 810. As noted above, the pixels corresponding to the objects each correspond to points on the objects. Additionally, the video conference application assigns each foreground pixel and each background pixel a corresponding coordinate and distance 815 on the pixel map.

In one embodiment, the video conference application will then identify a distance of a participant and/or a head size of the participant 820. As noted above, the distance of the participant and the head size of the participant can be determined by the video conference application analyzing the foreground pixels. In another embodiment, the distance of the participant and/or the head size of the participant are predefined. The video conference application can then create a region of interest with a default size 825.

In other embodiments, the video conference application can skip identifying the distance of the participant and/or the head size of the participant and proceed to create a region of interest with a default size 825 if the distance of the participant and/or the head size of the participant are predefined. As noted previously, the video conference application can modify a size of the region of interest in response to a head size of the participant, a distance of the participant, and/or a second moment method of the foreground pixels 830.

The video conference application further determines a location of the head portion of the participant and aligns the region of interest with the head portion of the participant 840. In one embodiment, one or more sensors are used independently or in conjunction with one or more depth cameras so as to locate a face or eyes of one or more participants so as to align the region of interest. Further, in other embodiments, facial recognition hardware and/or software can be utilized in conjunction with one or more depth cameras and/or one or more sensors to determine the location of the head portion of the participant.

Once the region of interest has been aligned, the video conference application crops the region of interest from the video stream of the participant to create a cropped video stream 850. As noted above, in one embodiment, the cropped video stream includes background pixels. In other embodiments, none of the background pixels are included in the cropped video stream. The video conference application then proceeds to arrange the cropped video stream of the participant with additional cropped video streams of additional participants for display in a video conference 860.

Additionally, as noted above, in one embodiment, the video conference application will also replace the background pixels with common background pixels for the cropped video stream of the participant and the additional cropped video streams of additional participants 870. Further, in another embodiment, if the cropped video stream of one participant does not match one or more of the additional cropped video streams of additional participants, the video conference application further scales the cropped video streams such that the dimensions of the cropped video stream match dimensions of the additional cropped video streams.

As noted above, the participants in the video conference can be manually or automatically assigned a priority level. One or more sensors can be utilized to detect a priority level or any of the participants can manually enter their corresponding priority level. Further, in one embodiment, the video conference application can include corresponding cropped video streams of high priority participants in a priority area and include corresponding cropped video streams of low priority participants in a non-priority area.

Additionally, the corresponding cropped video streams of the high priority participants can be upscaled to a larger size so as emphasize their activity level or significance in the video conference 880. Further, the corresponding cropped video streams of participants classified with a low priority can be downscaled or re-cropped in response to their low priority 890. As noted above, in one embodiment, in re-cropping the already cropped video streams, the video conference application crops out the torso portion and includes the head portion to display. Additionally; as noted above, if any of the participants' activity or priority level changes during the video conference, steps 880 and 890 can be repeated in order to emphasize the change in the corresponding participant's priority level. The method is then complete, or the video conference application can continue to repeat the process or any of the steps disclosed in FIG. 8. In other embodiments, the method of FIG. 8 includes additional steps in addition to and/or in lieu of those depicted in FIG. 8.

By utilizing one or more depth cameras to determine a distance of a participant and/or a head size of the participant, a region of interest on the participant can be modified and be properly aligned on a video stream of the participant. By cropping the region of interest out from the video stream a cropped video stream of the participant can be created and arranged along with additional cropped video streams of other participants in a video conference. As a result, time is saved for the participants in cropping out undesirable background objects and bandwidth is saved in not including undesirable objects for the video conference. Further, by scaling or cropping the cropped video streams in the video conference, flexibility and user friendliness is increased.

What is claimed is:

1. A method to present participants in a video conference comprising:
    determining a participant distance and aligning a region of interest on the participant using one or more depth cameras;
    creating a cropped video stream of the participant by cropping the region of interest from a video stream of the participant;
    replacing background pixels in the region of interest with common background pixels; and
    arranging the cropped video stream of the participant with additional cropped video streams of additional participants for display in the video conference.

2. The method to present participants in a video conference of claim 1 wherein determining the participant distance includes the depth camera capturing pixels corresponding to objects within view of the depth camera for populating a pixel map and labeling the pixels having a distance less than a predefined threshold as foreground pixels and labeling the pixels having a distance greater than or equal to the predefine threshold as the background pixels.

3. The method to present participants in a video conference of claim 2 wherein the foreground pixels and the background pixels on the pixel map include a corresponding pixel distance and a corresponding coordinate.

4. The method to present participants in a video conference of claim 2 further comprising creating a binary map of the foreground pixels and the background pixels and aligning the region of interest around the foreground pixels.

5. The method to present participants in a video conference of claim 4, wherein replacing the background pixels in the region of interest with the common background pixels further includes replacing the background pixels in the region of interest with the common background pixels for the additional cropped video streams of additional participants.

6. The method to present participants in a video conference of claim 4 further comprising modifying a size of the region of interest in response to at least one from the group consisting of the participant distance, a head portion size of the participant, and a second moment method of the foreground pixels.

7. A machine comprising:
    a processor;
    a depth camera to determine a distance of a participant from the depth camera by measuring distances of pixels corresponding to the participant;
    a display device to display a video conference which includes a cropped video stream of the participant; and
    a video conference application executable by the processor from computer readable memory and to create the cropped video stream by aligning and cropping a region of interest from a video stream of the participant, wherein the cropped video stream includes a static common background.

8. The machine of claim 7 wherein one or more depth cameras utilize a rangefinder or emit light pulses to determine the distances of the pixels corresponding to the participant.

9. The machine of claim 7 wherein one or more cameras or one or more sensor devices are to determine priority levels of one or more participants.

10. The machine of claim 7 wherein a location of a head portion of the participant is determined by at least one from the group consisting of the depth camera, one or more sensors, and a facial recognition application.

11. The machine of claim 10 wherein dimensions of the region of interest are rectangular and the region of interest includes the head portion of the participant and a torso portion of the participant.

12. The machine of claim 10 wherein the region of interest is aligned with the head portion of the participant.

13. A computer-readable program in a non-transitory computer-readable medium comprising:
    a video conference application to instruct a depth camera to identify distances of foreground pixels included in a pixel map that correspond to a participant;
    wherein the video conference application is further to modify a size of a region of interest and align the region of interest with a head portion of the participant;
    wherein the video conference application is additionally to crop the region of interest from a video stream of the participant and arrange the cropped video stream with additional cropped video streams of additional participants in a video conference, wherein the cropped video stream includes the foreground pixels and does not include background pixels.

14. The medium of claim 13 wherein the video conference application is further to upscale one or more of the cropped video streams of the participants classified with high priority level.

15. The medium of claim 13 wherein the video conference application is further to downscale or re-crop one or more of the cropped video streams of the participants classified with a low priority level.

* * * * *